US012597969B2

(12) United States Patent
Li et al.

(10) Patent No.: US 12,597,969 B2
(45) Date of Patent: Apr. 7, 2026

(54) INFORMATION TRANSMISSION METHOD AND DEVICE, AND STORAGE MEDIUM

(71) Applicant: ZTE CORPORATION, Shenzhen (CN)

(72) Inventors: Yong Li, Shenzhen (CN); Hao Wu, Shenzhen (CN); Zhaohua Lu, Shenzhen (CN); Yuxin Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 12 days.

(21) Appl. No.: 18/698,230

(22) PCT Filed: Oct. 28, 2022

(86) PCT No.: PCT/CN2022/128290
§ 371 (c)(1),
(2) Date: Apr. 3, 2024

(87) PCT Pub. No.: WO2023/078177
PCT Pub. Date: May 11, 2023

(65) Prior Publication Data
US 2024/0405815 A1     Dec. 5, 2024

(30) Foreign Application Priority Data
Nov. 4, 2021     (CN) .......................... 202111301751.3

(51) Int. Cl.
*H04B 7/0456*          (2017.01)
(52) U.S. Cl.
CPC ................................. *H04B 7/0456* (2013.01)

(58) Field of Classification Search
CPC ... H04B 7/04; H04B 7/06; H04B 7/10; H04B 7/066; H04B 7/0417; H04B 7/0456;
(Continued)

(56) References Cited

U.S. PATENT DOCUMENTS 10,812,164 B2 *  10/2020  Park ..................... H04L 5/0048
2021/0175950 A1     6/2021  Sergeev et al.
(Continued)

FOREIGN PATENT DOCUMENTS

CN          110535513  A     12/2019
CN          113039728  A      6/2021
(Continued)

OTHER PUBLICATIONS

International Search Report in Application No. PCT/CN2022/128290, dated Dec. 13, 2022, 4 pages, including translation.
(Continued)

*Primary Examiner* — Shawkat M Ali
(74) *Attorney, Agent, or Firm* — Morgan, Lewis & Bockius LLP

(57)          ABSTRACT
Provided are an information transmission method and device, and a storage medium. An information transmission method applied to a first communication node includes that: configuration information of a second communication node is received; and channel state information is reported to the second communication node according to the configuration information. The channel state information includes a precoding matrix indicator, a precoding matrix corresponding to the precoding matrix indicator includes a combination of a first coefficient and a first group of vectors or a combination of a first coefficient, a first group of vectors and a second group of vectors.

19 Claims, 2 Drawing Sheets

Receive configuration information of a second communication node — S110

Report channel state information to the second communication node according to the configuration information — S120

(58) Field of Classification Search
 CPC ....... H04B 7/0626; H04B 7/0639; H04L 1/00;
  H04L 1/06; H04L 5/00; H04L 5/005;
  H04L 25/02; H04W 24/02; H04W 72/04;
  H04W 72/542; H04W 72/0453
 USPC ......................... 375/219, 260, 267, 295, 316
 See application file for complete search history.

(56) References Cited

U.S. PATENT DOCUMENTS

| | | | |
|---|---|---|---|
| 2021/0258058 A1* | 8/2021 | Wu ...................... | H04B 7/0417 |
| 2021/0367652 A1* | 11/2021 | Wernersson ......... | H04B 7/0634 |

FOREIGN PATENT DOCUMENTS

| | | |
|---|---|---|
| CN | 113491074 A | 10/2021 |
| EP | 3876433 A1 | 9/2021 |
| WO | 2020135573 A1 | 7/2020 |

OTHER PUBLICATIONS

Extended European Search Report in Application No. 22889202.2, dated May 14, 2025, 18 pages.

\* cited by examiner

INFORMATION TRANSMISSION METHOD AND DEVICE, AND STORAGE MEDIUM

CROSS REFERENCE TO RELATED APPLICATIONS AND TECHNICAL FIELD

This is a national stage application filed under 37 U.S.C. 371 based on International Patent Application No. PCT/CN2022/128290, filed on Oct. 28, 2022, which is based on and claims priority to a Chinese Patent Application No. 202111301751.3 filed on Nov. 4, 2021, disclosures of which are incorporated herein by reference in their entireties. The present application relates to the field of communications, for example, to an information transmission method and device, and a storage medium.

The present application relates to the field of communications, for example, to an information transmission method and device, and a storage medium.

BACKGROUND

In the wireless communication system, the base station may determine a data transmission strategy according to a channel state represented by the received channel state information and transmit data according to the data transmission strategy so as to improve the data transmission efficiency. Therefore, how to design a processing mechanism of the channel stage information to improve the accuracy of obtaining the channel state, reduce the used resource overhead, and reduce the system complexity remains an urgent problem to be solved.

SUMMARY

An embodiment of the present application provides an information transmission method applied to a first communication node. The information transmission method includes that: configuration information of a second communication node is received; and channel state information is reported to the second communication node according to the configuration information. The channel state information includes a precoding matrix indicator, a precoding matrix corresponding to the precoding matrix indicator includes a combination of a first coefficient and a first group of vectors or a combination of a first coefficient, a first group of vectors and a second group of vectors.

An embodiment of the present application provides an information transmission method applied to a second communication node. The information transmission method includes that: configuration information is determined; and the configuration information is sent to a first communication node so that the first communication node reports channel state information according to the configuration information. The channel state information includes a precoding matrix indicator, a precoding matrix corresponding to the precoding matrix indicator includes a combination of a first coefficient and a first group of vectors or a combination of a first coefficient, a first group of vectors and a second group of vectors.

An embodiment of the present application provides a communication device. The communication device includes a communication module, a memory, and one or more processors. The communication module is configured to perform a communication interaction between a first communication node and a second communication node. The memory is configured to store one or more programs. The one or more processors, when executed by the one or more processors, cause the one or more processors to implement the method of any one of the above-described embodiments.

An embodiment of the present application provides a storage medium. The storage medium stores a computer program. The computer program, when executed by a processor, implements the method of any one of the above-described embodiments.

DETAILED DESCRIPTION

Figure 1:
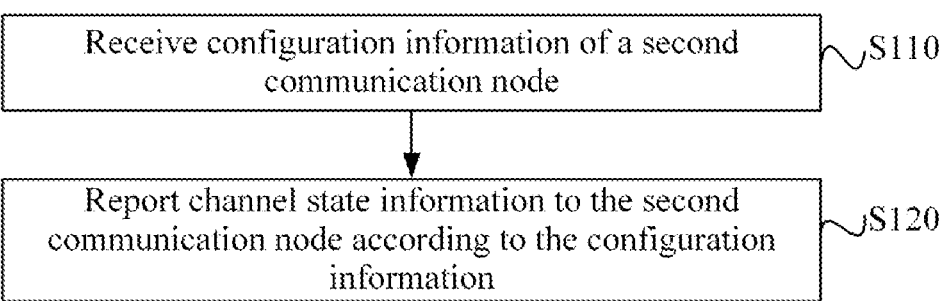
FIG. 1 is a flowchart of an information transmission method according to an embodiment of the present application.

Hereinafter, embodiments of the present application will be described in conjunction with the accompanying drawings. The present application is described below in conjunction with the accompanying drawings in the embodiments. The instances are given solely for the purpose of illustration the present application and are not intended to limit the scope of the present application.

The wireless communication has evolved to 5th generation communication technology. A long term evolution (LTE) technology in the 4th generation wireless communication technology and a new radio (NR) technology in the 5th generation wireless communication technology are based on orthogonal frequency division multiplexing (OFDM). In the OFDM technology, a smallest frequency domain unit is a subcarrier, and a smallest time domain unit is an OFDM symbol. In order to facilitate the use of a frequency domain resource, resource blocks (RBs) are defined, one resource block is defined as a certain number of consecutive subcarriers; bandwidth blocks (BWP) are defined, and one bandwidth block is defined as another certain number of consecutive resource blocks on a carrier. In order to facilitate the use of a time domain resource, slots (slots) are defined, one slot is defined for a further certain number of consecutive OFDM symbols.

A method for acquiring channel state information in a wireless communication system, and a method for performing a data transmission using the channel state information are provided. These methods include that: a base station sends a reference signal; a terminal measures the reference signal, determines channel state information from a base station to the terminal, and reports the channel state information to the base station; the base station receives the channel state information reported by the terminal. The base station determines a strategy of data transmission according to a channel state represented by the received channel state information, and transmits data, thereby improving the efficiency of data transmission. The accuracy degree of the channel state represented by the channel state information affects the transmission strategy of the base station, thereby affecting the efficiency of data transmission. Moreover, the base station transmits the reference signal, which needs to occupy an overhead of a downlink resource, and the terminal uploads the channel state information, which needs to occupy an overhead of an uplink resource. On the other hand, the increased complexity of the system will increase the cost of the system and increase the loss of energy. Therefore, multiple factors need to be considered comprehensively in terms of design.

The development of the wireless communication technology needs to further design mechanisms for processing channel state information in order to improve the accuracy of the obtained channel state, reduce the used resource overhead, and reduce the complexity of the system.

The reference signal sent by the base station to the terminal is a downlink reference signal. A downlink reference signal used for a channel state information report in an LTE system includes a cell-specific reference signal (CRS) and a channel-state information reference signal (CSI-RS). The downlink reference signal for the channel state information report in the NR system includes a CSI-RS. The CSI-RS is borne by a channel state information reference signal resource (CSI-RS Resource). The channel state information reference signal resource includes a code division multiplexing group (CDM group). One CDM group includes radio resource elements, and CSI-RSs of a group of CSI-RS ports are multiplexed thereon by means of a code division multiplexing.

The contents of the channel state information transmitted between the base station and the terminal include: a channel quality indicator (CQI) for indicating the quality of a channel; or a precoding matrix indicator (PMI) for indicating the precoding matrix applied to the base station antenna. A reporting form of a type of CQI is a wideband CQI reporting, that is, one channel quality is reported for a channel state information reporting band (CSI reporting band), and the channel quality corresponds to the whole channel state information reporting band. A reporting format of another type of CQI is sub-band CQI reporting, that is, a channel quality is separately given for the channel state information reporting band (CSI reporting band) by using a sub-band as a unit, where one channel quality corresponds to one sub-band, that is, one channel quality is reported for each sub-band of the channel state information reporting band. The sub-band is a frequency domain unit, and is defined as N continuous RBs, and N is a positive integer. For the convenience of description, the sub-band is referred to as a channel quality indication sub-band in the present application, or a CQI sub-band, or a sub-band. N is referred to as a size of a CQI sub-band, or a CQI sub-band size, or a sub-band size. A bandwidth block (BWP, Bandwidth part) is divided into sub-bands, and the channel state information reporting band (CSI reporting band) is defined by using a subset of a sub-band of the bandwidth part (BWP). The channel state information reporting band (CSI reporting band) is a band on which the channel state information needs to be reported.

A manner of determining a channel quality is determined according to the strength of the reference signal received by the terminal, and another manner of determining the channel quality is determined according to the signal-to-noise ratio of the received reference signal. In a channel state information reporting band, if the channel quality does not change greatly, then the report of a CQI in a manner of a broadband CQI report may reduce the resource overhead for the CQI report. If the channel quality greatly differs in the frequency domain, the report of the CQI in a manner of a sub-band CQI report may increase the accuracy degree of the CQI report.

A reporting format of one type of PMI is a wideband PMI report, that is, one PMI is reported for a channel state information reporting band, and the PMI corresponds to the whole channel state information reporting band. Another reporting format of PMI is sub-band PMI report, that is, one PMI is reported for each sub-band of the channel state information reporting band, or a component of a PMI is reported for each sub-band of the channel state information reporting band. For example, the PMI includes X1 and X2, one manner to report the components of one PMI for each sub-band of the channel state information reporting band is that: one X1 is reported for the whole band, one X2 is reported for each sub-band, another manner is to report one X1 and one X2 for each sub-band.

A reporting format of yet another type of PMI is that the reported PMI indicates R precoding matrices for each sub-band, where R is a positive integer. In the sense of feeding back the frequency domain granularity of the precoding matrix, R in turn denotes a number of precoding matrix sub-bands included in each sub-band, or a number of precoding matrix sub-bands included in each CQI sub-band.

A method for reporting channel state information is provided. The method includes that: a terminal receives configuration information (including first configuration information and second configuration information) of a base station; the terminal receives a channel state information reference signal transmitted by the base station according to the configuration information; and the terminal reports the channel state information according to the configuration information. The channel state information includes a precoding matrix indicator, and the precoding matrix is determined by a first group of vectors, or determined by a first group of vectors and a second group of vectors; the first group of vectors contains L vectors, and the second group of vectors contains $M_v$ vectors, where L and $M_v$ are a positive integer, and one vector in the first group of vectors corresponds to one port of the channel state information reference signal; one vector in the second group of vectors is a discrete fourier transform (DFT) vector with an index number of $$n_3^{(f)}.$$

An element of a DFT vector with the index number of $$n_3^{(f)} \text{ is } e^{j\frac{2\pi t n_3^{(f)}}{N_3}},$$

where t={0, 1, . . . , $N_3$−1}, and $N_3$ is a number of precoding matrices.

Where, t is an index number of an element in the DFT vector, t is 0, 1, . . . , $N_3$−1. Where, t may also represent an index number of a precoding matrix. Where, t may also represent an index number of the frequency-domain unit, and a value of t may correspond to one frequency-domain unit. For example, the precoding matrix with index number of t corresponding to an element of an index number of t of the DFT vector in the second group of vectors is the precoding matrix of the frequency domain unit with index number of t.

The precoding matrix may only include the first group of vectors, and may include both the first group of vectors and the second group of vectors. The precoding matrix only includes the first group of vectors, where one example is $W = W_1 W_2$, W denotes the precoding matrix, $W_1$ denotes a matrix formed by the first group of vectors, $W_2$ denotes a coefficient for combining the first group of vectors to form the precoding matrix, and is represented as a matrix. The precoding matrix includes the first group of vectors and the second group of vectors, where one example is $W = W_1 W_2 W_f$, and W denotes the precoding matrix, $W_1$ denotes a matrix constituting the first group of vectors, $W_f$ denotes a matrix constituting the second group of vectors, $W_2$ denotes a coefficient of the precoding matrix formed by combining the first group of vectors and the second group of vectors, and is represented as a matrix.

In order for the terminal to report CSI, the base station reports a CSI-RS resource to the terminal, where a number of ports of the CSI-RS resource is P; the terminal selects $K_1$ port from P CSI-RS ports, where L ports are selected in each polarization direction, $K_1 = 2L$; each port of the L ports is mapped to one vector of the first group of vectors; the terminal reports that a number of coefficients of one layer constituting the precoding matrix does not exceed $K_0$, and a number of total coefficients of all layers constituting the precoding matrix reported does not exceed $2K_0$; where $K_0 = \lceil 2LM_v \beta \rceil$, and $\beta$ is a parameter configured by the base station for the terminal. The terminal reports the base station that a number of reported coefficients is $K^{NZ}$.

A manner of mapping a port with a sequence number of $m_i$ to a mapping vector $v_{m_i}$ is as follows: $v_{m_i}$ is a vector including P/2 elements, where the $(m_i \bmod P/2)$-th element is 1, and the other elements are 0; where mod denotes a modulo operation, $m_i$ denotes a dividend, and P/2 denotes a divisor; and the first element is the 0th element. P being 8 and $m_i$ being 2 are used as an example, $v_2 = [0, 0, 1, 0]^T$, and T denotes a transposition.

An example of $W_1$ formed by L vectors, $$W_1 = \begin{bmatrix} v_{m_0} & v_{m_1} & \cdots & v_{m_{L-1}} & O & O & O & O \\ O & O & O & O & v_{m_0} & v_{m_1} & \cdots & v_{m_{L-1}} \end{bmatrix},$$

where O denotes a vector containing P/2 elements and all elements being 0.

A vector in the second group of vectors is recorded as $y^{(f)}$, where $f = 0, 1, \ldots, M_v - 1$, for example, $M_v$ vectors in the second group of vectors are $y^{(0)}, y^{(1)}, \ldots, y^{(M_v - 1)}$ and are a row vector. An example of $W_f$ formed by $M_v$ vectors in the second group of vectors is as follows:

$$W_f = \begin{bmatrix} y^{(0)} \\ y^{(1)} \\ \vdots \\ y^{(M_v - 1)} \end{bmatrix}.$$

Where the precoding matrix only includes the first group of vectors, one example of the precoding matrix is $W = W_1 W_2$, where W denotes a precoding matrix; $W_1$ denotes a matrix included the first group of vectors, where a dimension of the matrix is P×2L, that is, a first dimension is P, and a second dimension is 2L, and $W_2$ denotes a coefficient for combining the first group of vectors to form the precoding matrix, and is represented by a matrix, a dimension of the matrix is 2L×1, that is, the first dimension is 2L, and the second dimension is 1, that is, a number of elements included in $W_2$ is 2L, that is, a number of coefficients forming one layer of the precoding matrix is 2L.

In a case where the precoding matrix includes the first group of vectors and the second group of vectors, one example of the precoding matrix is $W = W_1 W_2 W_f$, where W denotes a precoding matrix; $W_1$ denotes a matrix constituting the first group of vectors, where a dimension of the matrix is P×2L, that is, a first dimension is P, and a second dimension is 2L; $W_f$ denotes a matrix formed by the second group of vectors, where a dimension of the matrix is $M_v \times N_3$, that is, a first dimension is $M_v$, and a second dimension is $N_3$; $W_2$ denotes coefficients for combining the first group of vectors and the second group of vectors to form a precoding matrix, and is represented by a matrix, where a dimension of the matrix is $2L \times M_v$, that is, a first dimension is 2L and a second dimension is My, that is, a number of elements included in $W_2$ is $2LM_v$, that is, a number of coefficients forming one layer of the precoding matrix is $2LM_v$.

In order to save the overhead of the terminal being reporting the precoding matrix indicator, the terminal only reports a part of the coefficients constituting the precoding matrix. For example, the base station configures a parameter $\beta$ to the terminal and determines a parameter $K_0$, where $K_0 = \lceil 2LM_v \beta \rceil$, and $\beta$ is a positive number less than or equal to 1. For a coefficient of a layer constituting a precoding matrix, a number of coefficients reported by the terminal to the base station does not exceed $K_0$; for coefficients of all layers constituting the precoding matrix, a number of coefficients reported by the terminal to the base station does not exceed $2K_0$. In order to enable the base station to receive the reported coefficients, the terminal also reports a number of the reported coefficients of $K^{NZ}$ to the base station, and reports a bitmap, in which non-zero bits of the bitmap are used to indicate which coefficients of the coefficients constituting the precoding matrix are reported. Where $K^{NZ}$ denotes that a number of coefficients of nonzero values reported from the terminal to the base station is K.

In an embodiment, FIG. 1 is a flowchart of an information transmission method according to an embodiment of the present application. This embodiment may be performed by a first communication node. The first communication node may be a terminal side (such as, a user equipment). As shown in FIG. 1, this embodiment includes S110 to S120.

In S110, configuration information of a second communication node is received.

The second communication node refers to a network side node that establishes a communication connection with the first communication node. Exemplarily, the second communication node may be a base station.

In S120, channel state information is reported to the second communication node according to the configuration information.

The channel state information includes a precoding matrix indicator, a precoding matrix corresponding to the precoding matrix indicator includes a combination of a first coefficient and a first group of vectors or a combination of a first coefficient, a first group of vectors and a second group of vectors.

In an embodiment, the first coefficient refers to a coefficient for constituting the precoding matrix, that is, the coefficient constituting the precoding matrix is the first coefficient. In an embodiment, the precoding matrix is formed by combining the first coefficient and the first group of vectors, or the precoding matrix is formed by combining the first coefficient, the first group of vectors, and the second group of vectors.

In an embodiment, the channel state information includes a precoding matrix indicator, and a precoding matrix corresponding to the precoding matrix indicator is determined by the first group of vectors or by the first group of vectors and the second group of vectors. The first group of vectors includes L vectors, and the second group of vectors includes $M_v$ vectors, where L and $M_v$ are a positive integer. One vector of the first group of vectors corresponds to one port of the channel state information reference signal. One element of one vector of the second group of vectors corresponds to one precoding matrix. The configuration information may include a value of L, or the configuration information may include a value of L and a value of $M_v$. Of course, the configuration information may further include version information of the codebook of the precoding matrix. In an embodiment, the first communication node reports the channel state information according to the configuration information sent by the second communication node, that is, the first communication node may selectively report the channel state information, and does not report all channel state information to the second communication node, thereby saving the resource overhead.

In an embodiment, that the channel state information to the second communication node is reported according to the configuration information includes that: a report condition of a first bitmap is determined, where the first bitmap is configured to indicate a to-be-reported coefficient in the first coefficient; an amplitude quantization set used by the first coefficient is determined according to the report condition of the first bitmap; and the first coefficient is reported to the second communication node according to the amplitude quantization set.

In an embodiment, the first bitmap is used to indicate the to-be-reported coefficient among the coefficients constituting the precoding matrix, and it should be understood that the first bitmap is used to characterize the index number of the to-be-reported coefficient in the first coefficient. In an embodiment, the report condition of the first bitmap may be determined according to a rank of the precoding matrix or the number of total vectors in the second group of vectors, that is, the first communication node determines whether to report the first bitmap to the second communication node according to the rank of the precoding matrix; or the first communication node determines whether to report the first bitmap to the second communication node according to the total number of vectors in the second group of vectors. The rank of the precoding matrix refers to a number of layers of the precoding matrix. In an embodiment, that the amplitude quantization set used by the first coefficient is determined according to the report condition of the first bitmap may be understood to be different between an amplitude quantization set used in a case where the first bitmap is reported to the second communication node and an amplitude quantization set used in a case where the first bitmap is not reported to the second communication node. In an embodiment, that the first coefficient is reported to the second communication node according to the amplitude quantization set may be understood to report one or more amplitude quantization values in the amplitude quantization set corresponding to the first coefficient and the first coefficient to the second communication node, thereby enabling not all first coefficients and the amplitude quantization values corresponding to all the to-be-reported coefficient to the second communication node, thereby saving the resource overhead of reporting the first coefficient and improving the accuracy performance of reporting the first coefficient.

In an embodiment, that the amplitude quantization set used by the first coefficient is determined according to the report condition of the first bitmap includes one of: the amplitude quantization set used by the first coefficient is determined as a first amplitude quantization set in response to reporting the first bitmap to the second communication node; or the amplitude quantization set used by the first coefficient is determined as a second amplitude quantization set in response to not reporting the first bitmap to the second communication node. In an embodiment, in a case that the first bitmap needs to be reported, the first coefficient is reported according to the first magnitude quantization set; and in a case where the first bitmap need not to be reported, the first coefficient is reported according to the second magnitude quantization set. In an embodiment, a number of elements included in the first magnitude quantization set may be different from a number of elements included in the second magnitude quantization set, or elements included in the first magnitude quantization set may be different from elements included in the second magnitude quantization set, which is not limited thereto.

In an embodiment, that the channel state information is reported to the second communication node according to the configuration information includes that: a number of to-be-reported coefficients in the first coefficient is determined; an amplitude quantization set used by the first coefficient is determined according to the number of to-be-reported coefficients in the first coefficient; and the to-be-reported coefficient in the first coefficient is reported to the second communication node according to the amplitude quantization set. In an embodiment, in order to ensure that the second communication node may receive all first coefficients reported by the first communication node, the first communication node is configured to, before the first coefficient is reported, predetermine the number of to-be-reported coefficients in the first coefficient, that is, determine that which coefficients in the first coefficients need to be reported and a total number of reported coefficients. Exemplarily, it is assumed that the number of to-be-reported coefficients is $K^{NZ}$, where NZ denotes a non-zero value, that is, the number of to-be-reported coefficients is K non-zero values. In the embodiment, part of coefficients in the first coefficient may be reported to the second communication node, and all coefficients in the first coefficient may be reported to the second communication node. It should be understood that an amplitude quantization set used in a case where the number of to-be-reported coefficients is the part of coefficients in the first coefficient is different form an amplitude quantization set used in a case where the number of the coefficient to be reported is all coefficients in the first coefficient. In an embodiment, the amplitude quantization set used to report the first coefficient is determined according to the number of to-be-reported coefficients in the first coefficient, so that the resource overhead of reporting the first coefficient can be flexibly saved, and the accuracy performance of the first coefficient can be improved.

In an embodiment, that the amplitude quantization set used by the first coefficient is determined according to the number of to-be-reported coefficients in the first coefficient includes one of: the amplitude quantization set used by the first coefficient is determined as a first amplitude quantization set in response to reporting part of coefficients in the first coefficient to the second communication node; or the amplitude quantization set used by the first coefficient is determined as a second amplitude quantization set in response to reporting all coefficients in the first coefficient.

In an embodiment, the first amplitude quantization set is different from the second amplitude quantization set.

In an embodiment, all elements in the first amplitude quantization set are non-zero values, and the second amplitude quantization set includes a zero value. In an embodiment, the first amplitude quantization set may not include a zero value, that is, all elements are non-zero values, and the second amplitude quantization set may include a zero value.

In an embodiment, that the channel state information is reported to the second communication node according to the configuration information includes that: a specific value of an amplitude indicator of the first coefficient is mapped to two candidate amplitude quantization values; and the first coefficient is reported to the second communication node according to the two candidate amplitude quantization values. In an embodiment, the specific value of the amplitude indicator of the first coefficient refers to a specific value in the amplitude indicator of the first coefficient. Exemplarily, the specific value of the amplitude indicator of the first coefficient may be a minimum value of the amplitude indicator of the first coefficient, or may be a maximum value, or may be 0, or may be configured by the second communication node, which is not limited thereto. In an embodiment, the candidate amplitude quantization values refer to amplitude quantization values that may be employed in the amplitude quantization set.

In an embodiment, one amplitude quantization value of the two candidate amplitude quantization values is indicated by using a non-zero bit in a second bitmap; or another amplitude quantization value of the two candidate amplitude quantization values is indicated by using a zero bit in a second bitmap. In an embodiment, one of the two candidate amplitude quantization values may be a non-zero value and another of the two candidate amplitude quantization values may be a zero value, which is not limited thereto. In an embodiment, the second bitmap is used to characterize an index number of the amplitude quantization value in the two candidate amplitude quantization values. It should be understood that a final amplitude quantization value of the first coefficient is indicated from the two candidate amplitude quantization values by using the second bitmap, moreover, a zero-value element is added in the amplitude quantization set which originally does not include the zero value, so that the bit overhead of the amplitude indicator of the first coefficient cannot be increased, or only the small resource overhead of the second bitmap relative to the specific value of the amplitude indicator is increased, the accuracy of feeding back the first coefficient is improved, and further the performance of the feedback precoding matrix is improved.

In an embodiment, a phase indicator of the first coefficient corresponding to the specific value includes one of a zero phase or a non-zero phase, a candidate amplitude quantization value, to which the amplitude indicator of the first coefficient indicated by the zero phase is mapped, is a zero value, and a candidate amplitude quantization value, to which the amplitude indicator of the first coefficient indicated by the non-zero phase is mapped, is a non-zero value. In an embodiment, one amplitude quantization value of the two candidate amplitude quantization values is a non-zero value and another amplitude quantization value of the two candidate amplitude quantization values is a zero value. In an embodiment, the specific value of the amplitude indicator of the first coefficient is mapped to two candidate amplitude quantization values, and the phase indicator of the first coefficient corresponding to the specific value is used to indicate the final amplitude quantization value of the first coefficient from the two candidate amplitude quantization values, thereby adding the zero-value element to the amplitude quantization set that does not originally include the zero-value element without increasing the bit overhead of the amplitude indicator of the first coefficient, thereby improving the accuracy of the feedback of the first coefficient, and further improving the performance of the feedback precoding matrix.

In an embodiment, that the channel state information is reported to the second communication node according to the configuration information includes that: a phase quantization set, to which a phase indicator of the first coefficient is mapped, corresponding to the value is determined according to a value of an amplitude indicator of the first coefficient; and the first coefficient is reported to the second communication node according to the phase quantization set.

In an embodiment, that the phase quantization set, to which the phase indicator of the first coefficient is mapped, corresponding to the value is determined according to the value of the amplitude indicator of the first coefficient includes one of: the phase quantization set, to which the phase indicator of the first coefficient is mapped, corresponding to the value is determined as a first phase quantization set in response to determining that the value of the amplitude indicator of the first coefficient belongs to a first set; or the phase quantization set, to which the phase indicator of the first coefficient is mapped, corresponding to the value is determined as a second phase quantization set in response to determining that the value of the amplitude indicator of the first coefficient belongs to a second set. In an embodiment, the value of the amplitude indicator of the first coefficient is divided into two sets, a first set and a second set, respectively; and the phase quantization set to which the phase indicator of the first coefficient is mapped includes two sets, i.e., a first phase quantization set and a second phase quantization set.

In an embodiment, in response to determining that the value of the amplitude indicator of the first coefficient belongs to the second set, and the phase indicator of the first coefficient is mapped to the second phase quantization set, an amplitude quantization value of the first coefficient are indicated jointly by the amplitude indicator of the first coefficient and the phase indicator of the first coefficient.

In an embodiment, in response to determining that the value of the amplitude indicator of the first coefficient belongs to the second set, and the phase indicator of the first coefficient is mapped to the second phase quantization set, an amplitude quantization value of the first coefficient is indicated jointly by the amplitude indicator of the first coefficient and a second bitmap.

In an embodiment, the amplitude quantization value of the first coefficient is indicated jointly by the amplitude indicator of the first coefficient and the phase indicator, or the amplitude quantization value of the first coefficient is indicated jointly by the amplitude indicator of the first coefficient and the second bitmap, thereby improving the performance of the feedback first coefficient, improving the performance of the feedback precoding matrix, and saving the resource overhead for feeding back the first coefficient.

Figure 2:
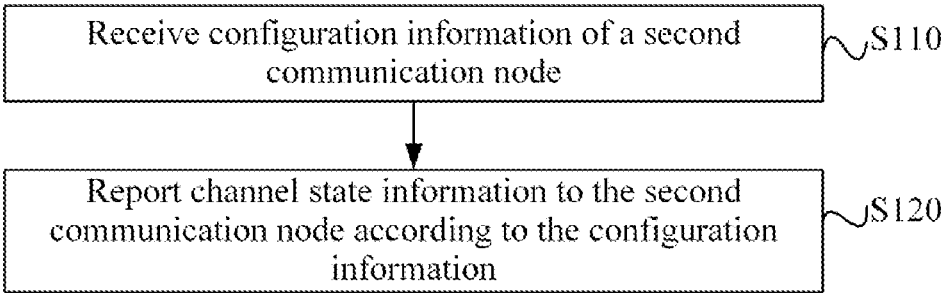
FIG. 2 is a flowchart of another information transmission method according to an embodiment of the present application.

In an embodiment, FIG. 2 is a flowchart of another information transmission method according to an embodiment of the present application. This embodiment may be performed by the second communication node. The second communication node may be a base station side. As shown in FIG. 2, this embodiment includes S210 to S220.

In S210, configuration information is determined.

In S220, the configuration information is sent to a first communication node so that the first communication node reports channel state information according to the configuration information.

the channel state information includes a precoding matrix indicator, a precoding matrix corresponding to the precoding matrix indicator includes a combination of a first coefficient and a first group of vectors or a combination of a first coefficient, a first group of vectors and a second group of vectors.

In the embodiment, the explanation of the relevant parameters such as the configuration information, the channel state information, and the first coefficient is given in the above description of an implementation of the information transmission method applied to the first communication node, and details are not described herein.

In an embodiment, the reporting process of the channel state information is described by using an example in which the first communication node is a terminal and the second communication node is a base station. In an embodiment, the step of reporting the channel state information may include that: the terminal receives the configuration information of the base station, and the terminal reports the channel state information according to the configuration information.

The channel state information includes a precoding matrix indicator, and the precoding matrix is determined by the first group of vectors or by the first group of vectors and the second group of vectors. The first group of vectors includes L vectors, and the second group of vectors includes $M_v$ vectors, where L and $M_v$ are a positive integer. One vector of the first group of vectors corresponds to one port of the channel state information reference signal. One element of one vector of the second group of vectors corresponds to one precoding matrix.

Exemplarily, the configuration information includes a value of L, or the configuration information may include a value of L and a value of $M_v$. For another example, the configuration information includes version information of a codebook of the precoding matrix.

In an embodiment, the terminal reports the first coefficient. One reporting manner is to report a first bitmap, where the first bitmap indicates, in a non-zero bit, that which coefficients of the first coefficients are reported; to report a to-be-reported coefficient indicated by the first bitmap in the first coefficient. Another reporting manner is not to report the first bitmap, but to report all coefficients in the first coefficient. The first coefficient is a coefficient that combines the first group of vectors to form the precoding matrix, or the first coefficient is a coefficient that combines the first group of vectors and the second group of vectors to form the precoding matrix.

In an example, whether to report the first bitmap is determined according to a rank of the precoding matrix. The first bitmap indicates, in a non-zero bit, that which coefficients of the first coefficients are reported. The first coefficient is a coefficient that combines the first group of vectors to form the precoding matrix, or the first coefficient is a coefficient that combines the first group of vectors and the second group of vectors to form the precoding matrix.

The number of layers of the precoding matrix is the rank of the precoding matrix. The first bitmap is reported to indicate that which coefficients of the coefficients (i.e., the first coefficient) constituting the precoding matrix are reported, thereby saving the resource overhead of the report by reporting part of coefficients. Moreover, it is also necessary to consume the resource overhead to report the first bitmap. Therefore, it is necessary to screen whether to report the first bitmap to achieve the effect of saving the resource overhead, and meanwhile, to reduce the complexity of the system, and improve the accuracy of the reported precoding matrix.

The coefficients constituting the precoding matrix are coefficients by combining the first group of vectors to form the precoding matrix, or coefficients by combining the first group of vectors and the second group of vectors to form the precoding matrix, that is, the coefficients constituting the precoding matrix are the first coefficients. The number of coefficients constituting the precoding matrix increases as the rank of the precoding matrix increases. Therefore, in a case of a larger rank, the reporting of a smaller number of coefficients among the coefficients constituting the precoding matrix is achieved by reporting the first bitmap, so that the resource overhead for reporting may be saved significantly; while in a case of a smaller rank, the reporting of a smaller number of coefficients among the coefficients constituting the precoding matrix is achieved by reporting the first bitmap, so that the effect of saving the resource overhead is not obvious, and even the resource overhead is increased. Therefore, whether to report the first bitmap may be determined according to the rank of the precoding matrix.

For example, in response of determining that the rank of the precoding matrix is 1, the first bitmap is not reported.

For another example, in response of determining that the rank of the precoding matrix is 1, the first bitmap is not reported. In response of determining that the rank of the precoding matrix is greater than 1, the first bitmap is reported.

For another example, in response of determining that the rank of the precoding matrix is 1, the first bitmap is not reported. In response of determining that the rank of the precoding matrix is greater than 1, whether to report the first bitmap is determined according to $\beta$.

For another example, in response of determining that the rank of the precoding matrix is 1, the first bitmap is not reported. In response of determining that the rank of the precoding matrix is greater than 1, whether to report the first bitmap is determined according to $K^{NZ}$.

The base station configures a parameter $\beta$ to the terminal and determines the parameter $K_0$, where $K_0 = \lceil 2LM_v\beta \rceil$, and $\beta$ is a positive number less than or equal to 1. For a coefficient of a layer constituting the precoding matrix, a number of coefficients reported by the terminal to the base station does not exceed $K_0$; for coefficients of all layers constituting the precoding matrix, a number of coefficients reported by the terminal to the base station does not exceed $2K_0$. In order to enable the base station to receive the reported coefficients, the terminal also reports, to the base station, a number of reported coefficients among the coefficients constituting the precoding matrix, i.e., $K^{NZ}$. The parameter $\beta$ and the rank of the precoding matrix jointly determine an upper limit of the number of reported coefficients, and correspondingly, the parameter $\beta$ determines that part of coefficients in the coefficients constituting the precoding matrix are reported by reporting the first bitmap at different ranks, so that the lower limit of the resource overhead is saved. Therefore, whether to report the first bitmap is jointly determined according to the rank of the precoding matrix and the parameter B. The $K^{NZ}$ and the rank of the precoding matrix may calculate that the part of coefficients in the coefficients constituting the precoding matrix are reported by reporting the first bitmap, so that the resource overhead is saved, and thus, whether to report the first bitmap is jointly determined according to the rank of the precoding matrix and $K^{NZ}$.

In another example, whether to report the first bitmap is determined according to $M_v$, where the first bitmap indicates, in a non-zero bit, that which coefficients are reported.

The number of coefficients constituting the precoding matrix is determined according to $M_v$, for example, the number of coefficients constituting the precoding matrix is $2LM_v$, the resource overhead of reporting the first bitmap is also determined according to $M_v$, for example, the overhead corresponding to one layer of the precoding matrix is $2LM_v$ bits. Therefore, the resource overhead of reporting the coefficient constituting the precoding matrix in a case of not reporting the first bitmap may be determined according to $M_v$; and the resource overhead range of reporting part of coefficients among the coefficients constituting the precoding matrix in a case of reporting the first bitmap may be determined according to $M_v$. Therefore, whether to report the first bitmap is determined according to $M_v$. The $M_v$ and the parameter $\beta$ may jointly determine the resource overhead of reporting the coefficients constituting the precoding matrix in a case of not reporting the first bitmap, and determine the upper limit of the resource overhead of reporting part of the coefficients constituting the precoding matrix in a case of reporting the first bitmap. Therefore, whether to report the first bitmap is determined according to $M_v$ and the parameter $\beta$. The $M_v$ and $K^{NZ}$ may jointly determine the resource overhead of reporting the coefficients constituting the precoding matrix in a case of not reporting the first bitmap, and may determine the resource overhead of reporting part of the coefficients constituting the precoding matrix in a case of reporting the first bitmap. Therefore, whether to report the first bitmap is determined according to $M_v$ and $K^{NZ}$. In response to determining that the rank of the precoding matrix is 1, then $M_v$ is 1, the terminal may indicate that which coefficients need to be reported by selecting 2L ports from P CSI-RS ports, and therefore, whether to report the first bitmap is determined jointly according to the rank of the precoding matrix and $M_v$.

For example, in response to determining that $M_v$ is 1, the first bitmap is not reported.

For another example, in response to determining that $M_v$ is 1, the first bitmap is not reported; and in response to determining that $M_v$ is greater than 1, the first bitmap is reported.

For another example, in response to determining that $M_v$ is 1, the first bitmap is not reported; and in response to determining that $M_v$ is greater than 1, whether to report the first bitmap is determined according to $\beta$.

For another example, in response to determining that $M_v$ is 1, the first bitmap is not reported; and in response to determining that $M_v$ is greater than 1, whether to report the first bitmap is determined according to $K^{NZ}$.

For another example, in response to determining that $M_v$ is 1 and the rank of the precoding matrix is 1, the first bitmap is not reported; and in response to determining that $M_v$ is greater than 1 and the rank of the precoding matrix is greater than 1, the first bitmap is reported.

For another example, in response to determining that $M_v$ is 1 and the rank of the precoding matrix is 1, the first bitmap is not reported; and in response to determining that $M_v$ is greater than 1 and the rank of the precoding matrix is greater than 1, whether to report the first bitmap is determined according to $\beta$, or whether to report the first bitmap is determined according to $K^{NZ}$.

In an embodiment, an amplitude quantization set used for reporting the first coefficient is determined according to whether to report the first bitmap, where the first coefficient is reported according to the first amplitude quantization set in response to reporting the first bitmap to the second communication node; and the first coefficient is reported according to the second amplitude quantization set in response to not reporting the first bitmap to the second communication node. The first amplitude quantization set is different from the second amplitude quantization set. The first coefficient is a coefficient that combines the first group of vectors to form the precoding matrix, or the first coefficient is a coefficient that combines the first group of vectors and the second group of vectors to form the precoding matrix.

In an embodiment, the first amplitude quantization set is different from the second amplitude quantization set, and the differences include the following four conditions:

a condition 1, a number of elements in the first magnitude quantization set is different from a number of elements in the second magnitude quantization set. For example, the number of elements in the first magnitude quantization set is less than the number of elements in the second magnitude quantization set. For another example, the number of elements in the first magnitude quantization set is greater than the number of elements in the second magnitude quantization set;

a condition 2, the first magnitude quantization set has elements not existing in the second magnitude quantization set. Alternatively, the second magnitude quantization set has elements not existing in the first magnitude quantization set;

a condition 3, the first amplitude quantization set does not have the zero-value element, and the second amplitude quantization set has the zero-value element; and a condition 4, a mapping relationship from the value of the amplitude indicator to the element in the first amplitude quantization set is different from a mapping relationship from the value of the amplitude indicator to the element in the second amplitude quantization set.

In an embodiment, the first bitmap indicates that which coefficients of the first coefficients need to be fed back, and an amplitude of the remaining coefficients that do not need to be fed back defaults to zero. Therefore, the first bitmap indicates some information of the first coefficient. Therefore, the first amplitude quantization set used for reporting the first coefficient in a case of reporting the first bitmap is different from the second amplitude quantization set used for reporting the first coefficients in a case of not reporting the first bitmap, so that the resource overhead of reporting the first coefficient can be saved, and the accuracy performance of reporting the first coefficient can be improved.

For example, elements in the first amplitude quantization set are $$\left\{ \frac{1}{8\sqrt{2}}, \frac{1}{8}, \frac{1}{4\sqrt{2}}, \frac{1}{4}, \frac{1}{2\sqrt{2}}, \frac{1}{2}, \frac{1}{\sqrt{2}}, 1 \right\}.$$

and elements in the second amplitude quantization set are $$\left\{ 0, \frac{1}{8\sqrt{2}}, \frac{1}{8}, \frac{1}{4\sqrt{2}}, \frac{1}{4}, \frac{1}{2\sqrt{2}}, \frac{1}{2}, \frac{1}{\sqrt{2}}, 1 \right\}.$$

The number of elements in the first amplitude quantization set is 8, and the number of elements in the second amplitude quantization set is 9.

For example, elements in the first amplitude quantization set are $$\left\{\frac{1}{8\sqrt{2}}, \frac{1}{8}, \frac{1}{4\sqrt{2}}, \frac{1}{4}, \frac{1}{2\sqrt{2}}, \frac{1}{2}, \frac{1}{\sqrt{2}}, 1\right\},$$

and elements in the second amplitude quantization set are $$\left\{0, \frac{1}{8}, \frac{1}{4\sqrt{2}}, \frac{1}{4}, \frac{1}{2\sqrt{2}}, \frac{1}{2}, \frac{1}{\sqrt{2}}, 1\right\}.$$

The number of elements in the first amplitude quantization set is 8, and these elements do not include the zero-value element. The number of elements in the second amplitude quantization set is 8, and these elements include the zero-value element.

For example, the mapping relationship from the value of the amplitude indicator to the element in the amplitude quantization set is shown in Table 1, where the mapping relationship from the value of the amplitude indicator to the element in the first amplitude quantization set is different from the mapping relationship from the value of the amplitude indicator to the element in the second amplitude quantization set.

TABLE 1

Mapping relationship table of amplitude indicator and element in amplitude quantization set

| amplitude indicator | first amplitude quantization set | second amplitude quantization set |
|---|---|---|
| 0 | $\frac{1}{8\sqrt{2}}$ | 0 |
| 1 | $\frac{1}{8}$ | $\frac{1}{8}$ |
| 2 | $\frac{1}{4\sqrt{2}}$ | $\frac{1}{4\sqrt{2}}$ |
| 3 | $\frac{1}{4}$ | $\frac{1}{4}$ |
| 4 | $\frac{1}{2\sqrt{2}}$ | $\frac{1}{2\sqrt{2}}$ |
| 5 | $\frac{1}{2}$ | $\frac{1}{2}$ |
| 6 | $\frac{1}{\sqrt{2}}$ | $\frac{1}{\sqrt{2}}$ |
| 7 | 1 | 1 |

In an embodiment, in response to reporting the first bitmap to the second communication node, the first coefficient is reported according to the first magnitude quantization set; and in response to not reporting the first bitmap, the first coefficient is reported according to the second magnitude quantization set. The first amplitude quantization set does not include the zero value and the second amplitude quantization set includes the zero value.

Part of coefficients in the first coefficient is reported according to an indication of the first bitmap, the reported coefficients do not include the zero value; while the first coefficient is reported in a case of not reporting the first bitmap, the reported first coefficient including the zero value.

In an embodiment, an amplitude quantization set used for reporting the first coefficient is determined according to the number of to-be-reported coefficients in the first coefficient. In response to reporting parts of coefficients in the first coefficient, the first coefficient is reported according to the first amplitude quantization set; and in response to reporting all coefficients in the first coefficient, the first coefficient is reported according to the second amplitude quantization set. The first amplitude quantization set is different from the second amplitude quantization set.

The amplitude quantization set used for reporting the first coefficient is determined according to the number of to-be-reported coefficients in the first coefficient, and examples are as follows.

For example, in response to determining that the number $K^{NZ}$ of to-be-reported coefficients in the first coefficient is less than the number $2LM_v r$ of all coefficients in the first coefficient, the first coefficient is reported according to the first magnitude quantization set. In response to determining that the number $K^{NZ}$ of to-be-reported coefficients in the first coefficient is equal to the number $2LM_v r$ of all coefficients in the first coefficient, the first coefficient is reported according to the second magnitude quantization set. Where r represents the rank of the precoding matrix.

For another example, in a case where the rank of the precoding matrix is greater than 1, in response to determining that the number $K^{NZ}$ of to-be-reported coefficients in the first coefficient is less than the number $2LM_v r$ of all coefficients in the first coefficient, the first coefficient is reported according to the first magnitude quantization set. In response to determining that the number $K^{NZ}$ of to-be-reported coefficients in the first coefficient is equal to the number $2LM_v r$ of all coefficients in the first coefficient, the first coefficient is reported according to the second magnitude quantization set.

For another example, in a case where the rank of the precoding matrix is greater than 1, in response to determining that the number $K^{NZ}$ of to-be-reported coefficients in the first coefficient is less than the predetermined number $2(2LM_v\beta)$ in the first coefficient, the first coefficient is reported according to the first magnitude quantization set. In response to determining that the number $K^{NZ}$ of to-be-reported coefficients in the first coefficient is greater than or equal to the predetermined number $2LM_v r$ in the first coefficient, the first coefficient is reported according to the second magnitude quantization set. Where, $\beta$ is a parameter configured by the base station to the terminal.

The amplitude quantization set used to report the first coefficient is determined according to the number of the to-be-reported coefficient in the first coefficient, so that the resource overhead of reporting the first coefficient can be flexibly saved, and the accuracy performance of the first coefficient can be improved.

In an embodiment, the specific value of the amplitude indicator of the first coefficient is mapped to two candidate amplitude quantization values (where the candidate amplitude quantization values refer to possible quantization values). In an embodiment, one amplitude quantization value of the two candidate amplitude quantization values is indicated by using a non-zero bit in a second bitmap; or another amplitude quantization value of the two candidate amplitude quantization values is indicated by using a zero bit in a second bitmap.

In an embodiment, one amplitude quantization value of the two candidate amplitude quantization values is a non-zero value, and another amplitude quantization value of the two candidate amplitude quantization values is a zero value.

For example, a specific value of the amplitude indicator of the first coefficient may be a minimum value of the amplitude indicator of the first coefficient. For another example, a specific value of the amplitude indicator of the first coefficient may be a maximum value of the amplitude indicator of the first coefficient. For another example, a specific value of the amplitude indicator of the first coefficient may be 0. For another example, a specific value of the amplitude indicator of the first coefficient may be determined by a protocol. For another example, a specific value of the amplitude indicator of the first coefficient may be configured by the base station to the terminal. In an embodiment, the non-zero value of the two candidate amplitude quantization values may be a smallest non-zero value in the amplitude quantization set. Alternatively, the two candidate amplitude quantization values may be the smallest two values in the amplitude quantization set. Alternatively, the two candidate amplitude quantization values may be the smallest two values in the amplitude quantization set, and one of the values is the zero value. In an embodiment, a specific value of the amplitude indicator of the first coefficient is mapped to two possible quantization values, and a final amplitude quantization value of the first coefficient is indicated from the two possible quantization values by using the second bitmap; in this way, the number of amplitude quantization values is increased, in particular in a case of adding the zero-value element to an amplitude quantization set that does not originally include the zero value, the accuracy of feeding back the first coefficient may be improved without increasing the bit overhead of the magnitude indicator of the first coefficient or by increasing only a small resource overhead of the second bitmap relative to the specific value of the magnitude indicator, and thus the performance of the feedback precoding matrix is improved.

In an embodiment, the specific value of the amplitude indicator of the first coefficient is mapped to two possible amplitude quantization values. The phase indicator of the first coefficient corresponding to the specific value indicates, in a zero phase, that the amplitude quantization value to which the amplitude indicator of the first coefficient is mapped is a zero value, and indicates, in a non-zero phase, that the amplitude quantization value to which the amplitude indicator of the first coefficient is mapped is a non-zero value.

In an embodiment, one of the two possible amplitude quantization values is a non-zero value, and another of two possible amplitude quantization values is a zero value;

For example, the specific value of the amplitude indicator of the first coefficient is mapped to two possible amplitude quantization values, i.e., s0 and s1, where s0 and s1 are two non-negative real numbers. The phase indicator of the first coefficient corresponding to the specific value indicates, in a zero phase, that the amplitude quantization value to which the amplitude indicator of the first coefficient is mapped is s0, and indicates, in a non-zero phase, that the amplitude quantization value to which the amplitude indicator of the first coefficient is mapped is s1. For another example, a specific value of the amplitude indicator for one coefficient u in the first coefficient is 0, the specific value 0 is mapped to two possible amplitude quantization values, i.e., s0 and s1, where s0 is zero and s1 is a non-zero real number. In response to determining that the phase indicator of the coefficient u indicates zero phase, the amplitude indicator for u maps to s0; and in response to determining that the phase indicator of the coefficient u indicates a non-zero phase, the amplitude indicator of u is mapped to s1. The specific value of the amplitude indicator of the first coefficient is mapped to two possible magnitude quantization values, a final magnitude quantization value of the first coefficient is indicated from the two possible magnitude quantization values by using the phase indicator of the first coefficient corresponding to the specific value; in this way, the number of amplitude quantization values is increased, in particular in a case of adding the zero-value element to an amplitude quantization set that does not originally include the zero value, the accuracy of feeding back the first coefficient may be improved without increasing the bit overhead of the magnitude indicator of the first coefficient, and thus the performance of the feedback precoding matrix is improved.

In an embodiment, the phase quantization set, to which the phase indicator of the first coefficient is mapped, corresponding to the value is determined according to the value of the amplitude indicator of the first coefficient. In response to determining that a value of the amplitude indicator of the first coefficient belongs to the first set, the phase indicator of the first coefficient corresponding to the value is mapped to the first phase quantization set. In response to determining that a value of the amplitude indicator of the first coefficient belongs to the second set, the phase indicator of the first coefficient is mapped to the second phase quantization set.

In an example, values of the magnitude indicator of the first coefficient are divided into two sets, i.e., a set A0 and a set A1. The phase quantization sets to which the phase indicator of the first coefficient is mapped are a set B0 and a set B1, respectively. In response to determining that the value of the amplitude indicator of the first coefficient belongs to the set A0, the phase quantization set corresponding to the phase indicator of the first coefficient is the set B0; and in response to determining that the value of the amplitude indicator of the first coefficient belongs to the set A1, the phase quantization set corresponding to the phase indicator of the first coefficient is the set B1.

In another example, in response to determining that the value of the amplitude indicator of the first coefficient belongs to the second set, the value of the amplitude indicator of the first coefficient is mapped to two possible amplitude quantization values, and the phase indicator of the first coefficient uses the second phase quantization set; and the phase indicator of the first coefficient indicates the amplitude quantization value of the first coefficient from two possible amplitude quantization values. For example, the value of the amplitude indicator of the first coefficient is divided into two sets, i.e., a set A0 and a set A1. The phase quantization sets to which the phase indicators of the first coefficient are mapped are a set B0 and a set B1, respectively. The value of the amplitude indicator of one coefficient u in the first coefficient belongs to the set A0, and the amplitude indicator of this coefficient is mapped to two possible amplitude quantization values s0 and s1. Correspondingly, the phase indicator of this coefficient is mapped to the phase quantization value of this coefficient according to the set B0; and the value of the phase indicator of this coefficient also indicates for this coefficient whether the specific amplitude quantization value is s0 or s1. For example, the value of the phase indicator is 0, it is indicated that the amplitude quantization value of this coefficient is s0, otherwise it is indicated that the amplitude quantization value of this coefficient is s1. For another example, the phase quantization value mapped by the phase indicator is 0, it is indicated that the coefficient amplitude quantization value is 0, otherwise, the phase quantization value mapped by the phase indicator indicates that the amplitude quantization value of the coefficient is non-zero.

In another example, in response to determining that the value of the amplitude indicator of the first coefficient belongs to the second set, the value of the amplitude indicator of the first coefficient is mapped to two possible amplitude quantization values, and the phase indicator of the first coefficient uses the second phase quantization set; and the second bitmap indicates the amplitude quantization value of the first coefficient from two possible amplitude quantization values. For example, the value of the amplitude indicator of the first coefficient is divided into two sets, i.e., a set A0 and a set A1, respectively; the phase quantization set to which the phase indicator of the first coefficient is mapped has a set B0 and a set B1; a value of the amplitude indicator of one coefficient u in the first coefficient belongs to the set A0, and the amplitude indicator of this coefficient is mapped to two possible amplitude quantization values s0 and s1. Correspondingly, the phase indicator of this coefficient is mapped to the phase quantization value of this coefficient according to the set B0; and the second bitmap indicates for this coefficient whether the specific amplitude quantization value is s0 or s1. For example, a value of a corresponding bit of the second bitmap is 1, it is indicated that the amplitude quantization value of the coefficient is so, otherwise it is indicated that the amplitude quantization value of the coefficient is s1. For another example, a value of a corresponding bit of the second bitmap is 1, it is indicated that the amplitude quantization value of the coefficient is 0; otherwise, the phase quantization value to which the phase indicator is mapped indicates that the amplitude quantization value of the coefficient is non-zero; or a value of a corresponding bit of the second bitmap is 1, it is indicated that the amplitude quantization value of the coefficient is non-zero, and otherwise, the phase quantization value to which the phase indicator is mapped indicates that the coefficient amplitude quantization value is zero. A number of elements in the second phase quantization set is less than a number of elements in the first phase quantization set. In this way, the quantization value of the amplitude of the first coefficient is increased, thereby improving the performance of feeding back the first coefficient, improving the performance of the feedback precoding matrix, and saving the resource overhead for feeding back the first coefficient.

In an embodiment, in response to determining that the value of the amplitude indicator of the first coefficient belongs to the second set, and the phase indicator of the first coefficient is mapped to the second phase quantization set, an amplitude quantization value of the first coefficient is jointly indicated by the amplitude indicator of the first coefficient and the phase indicator of the first coefficient.

In an embodiment, in response to determining that the value of the amplitude indicator of the first coefficient belongs to the second set, and the phase indicator of the first coefficient is mapped to the second phase quantization set, an amplitude quantization value of the first coefficient is jointly indicated by the amplitude indicator of the first coefficient and a second bitmap.

In an embodiment, the precoding matrix indicator being indicating R precoding matrices for each channel quality indicator (CQI) sub-band is determined according to a number of vectors of the second group of vectors, and R is a positive integer.

Where the number of vectors of the second group of vectors refers to the total number of vectors contained in the second group of vectors. As described below, a reporting format of one type of PMI is that the reported PMI indicates R precoding matrices for each CQI sub-band, where R is a positive integer. In the sense of the frequency domain granularity of the fed back precoding matrix, R represents the number of precoding matrix sub-bands included in each CQI sub-band or the number of precoding matrix sub-bands included in each CQI sub-band. The value of R is configured by the base station, for example, the value of R is configured by the base station to be 1, and the value of R is configured by the base station to be 2. That is, R has multiple candidate values, and the base station selects one configuration from the multiple candidate values to the terminal. One method of configuring the value of R is that: the value of R is indicated by the value of the number $M_v$ of vectors of the second group of vectors. For example, $M_v$ of 1 indicates that the value of R is 1. Alternatively, in response to determining that My is 1, the value of R is 1. For another example, $M_v$ of 2 indicates that the value of R is 2. Alternatively, in response to determining that $M_v$ is 2, the value of R is 2. The value of R is determined according to the value of R, so that R matches with R to improve the feedback accuracy of the precoding matrix. On the other hand, the additional overhead caused by the configuration R is also saved.

Figure 3:
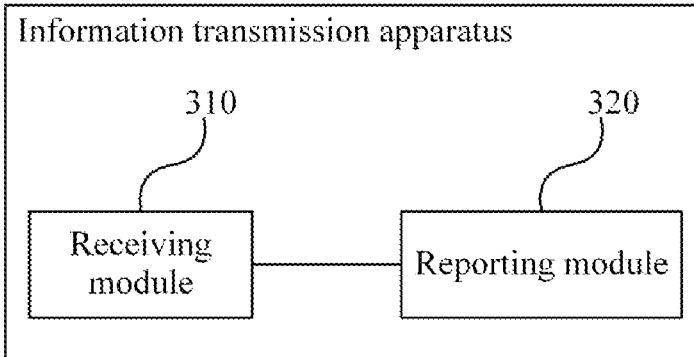
FIG. 3 is a structural block diagram of an information transmission apparatus according to an embodiment of the present application.

In an embodiment, FIG. 3 is a structural block diagram of an information transmission apparatus according to an embodiment of the present application. This embodiment applies to a first communication node. As shown in FIG. 3, the information transmission apparatus in this embodiment includes a receiving module 310 and a reporting module 320.

The receiving module 310 is configured to receive configuration information of a second communication node. The reporting module 320 is configured to report channel state information to the second communication node according to the configuration information. The channel state information includes a precoding matrix indicator, a precoding matrix corresponding to the precoding matrix indicator includes a combination of a first coefficient and a first group of vectors or a combination of a first coefficient, a first group of vectors and a second group of vectors.

In an embodiment, the reporting module 320 includes a first determination unit, a second determination unit and a first reporting unit. The first determination unit is configured to determine a report condition of a first bitmap, where the first bitmap is configured to indicate a to-be-reported coefficient in the first coefficient. The second determination unit is configured to determine an amplitude quantization set used by the first coefficient according to the report condition of the first bitmap. The first reporting unit is configured to report the first coefficient to the second communication node according to the amplitude quantization set.

In an embodiment, the second determination unit includes one of the following: in response to reporting the first bitmap to the second communication node, the amplitude quantization set used by the first coefficient is determined as a first amplitude quantization set; or in response to not reporting the first bitmap to the second communication node, the amplitude quantization set used by the first coefficient is determined as a second amplitude quantization set.

In an embodiment, the reporting module 320 includes a third determination unit, a fourth determination unit and a second reporting unit. The third determination unit is configured to determine a number of at least one to-be-reported coefficient in the first coefficient. The fourth determination unit is configured to determine an amplitude quantization set used by the first coefficient according to the number of the at least one to-be-reported coefficient in the first coefficient. The second reporting unit is configured to report the at least one to-be-reported coefficient in the first coefficient to the second communication node according to the amplitude quantization set.

In an embodiment, the fourth determination unit includes one of the following: in response to reporting part of coefficients in the first coefficient to the second communication node, the amplitude quantization set used by the first coefficient is determined as a first amplitude quantization set; or in response to reporting all coefficients in the first coefficient, the amplitude quantization set used by the first coefficient is determined as a second amplitude quantization set.

In an embodiment, the first amplitude quantization set is different from the second amplitude quantization set.

In an embodiment, all elements in the first amplitude quantization set are non-zero values, and the second amplitude quantization set includes a zero value.

In an embodiment, the reporting module 320 includes a mapping unit and a third reporting unit. The mapping unit is configured to map a specific value of an amplitude indicator of the first coefficient to two candidate amplitude quantization values. The third reporting unit is configured to report the first coefficient to the second communication node according to the two candidate amplitude quantization values.

In an embodiment, one amplitude quantization value of the two candidate amplitude quantization values is indicated by using a non-zero bit in a second bitmap; or another amplitude quantization value of the two candidate amplitude quantization values is indicated by using a zero bit in a second bitmap.

In an embodiment, a phase indicator of the first coefficient corresponding to the specific value includes one of a zero phase or a non-zero phase; a candidate amplitude quantization value, to which the amplitude indicator of the first coefficient indicated by the zero phase is mapped, is a zero value; and a candidate amplitude quantization value, to which the amplitude indicator of the first coefficient indicated by the non-zero phase is mapped, is a non-zero value.

In an embodiment, one amplitude quantization value of the two candidate amplitude quantization values is a non-zero value, and another amplitude quantization value of the two candidate amplitude quantization values is a zero value.

In an embodiment, the reporting module 320 includes a fifth determination unit and a fourth reporting unit. The fifth determination unit is configured to determine, according to a value of an amplitude indicator of the first coefficient, a phase quantization set, to which a phase indicator of the first coefficient is mapped, corresponding to the value. The fourth reporting unit is configured to report the first coefficient to the second communication node according to the phase quantization set In an embodiment, the fifth determination unit includes one of the following: in response to determining that the value of the amplitude indicator of the first coefficient belongs to a first set, the phase quantization set, to which the phase indicator of the first coefficient is mapped, corresponding to the value is determined as a first phase quantization set; or in response to determining that the value of the amplitude indicator of the first coefficient belongs to a second set, the phase quantization set, to which the phase indicator of the first coefficient is mapped, corresponding to the value is determined as a second phase quantization set.

In an embodiment, in response to determining that the value of the amplitude indicator of the first coefficient belongs to the second set, and the phase indicator of the first coefficient is mapped to the second phase quantization set, an amplitude quantization value of the first coefficient is jointly indicated by the amplitude indicator of the first coefficient and the phase indicator of the first coefficient.

In an embodiment, in response to determining that the value of the amplitude indicator of the first coefficient belongs to the second set, and the phase indicator of the first coefficient is mapped to the second phase quantization set, an amplitude quantization value of the first coefficient id jointly indicated by the amplitude indicator of the first coefficient and a second bitmap.

In an embodiment, the precoding matrix indicator being indicating R precoding matrices for each channel quality indicator (CQI) sub-band is determined according to a number of vectors of the second group of vectors, and R is a positive integer.

In an embodiment, the number of vectors of the second group of vectors is 1, which indicates that R is 1.

The information transmission apparatus provided by this embodiment is configured to implement the information transmission method applied to the first communication node in the embodiment shown in FIG. 1. The implementation principles and technical effects of the information transmission apparatus provided by this embodiment are similar to those of the information transmission method, and details are not described herein.

Figure 4:
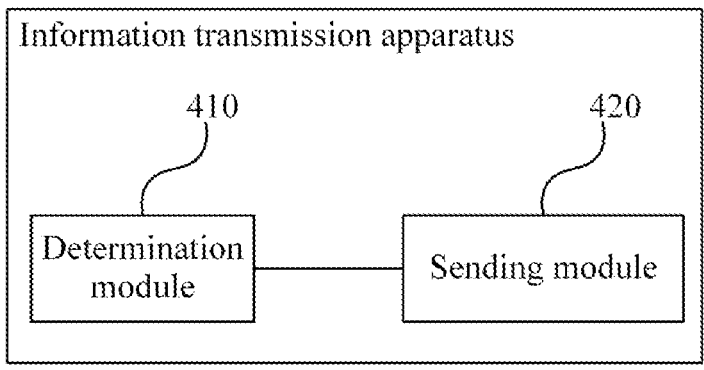
FIG. 4 is a structural block diagram of another information transmission apparatus according to an embodiment of the present application.

In an embodiment, FIG. 4 is a structural block diagram of another information transmission apparatus according to an embodiment of the present application. This embodiment applies to a first communication node. As shown in FIG. 4, the information transmission apparatus in this embodiment includes a determination module 410 and a sending module 420.

The determination module 410 is configured to determine configuration information. The sending module 420 is configured to send the configuration information to a first communication node so that the first communication node reports channel state information according to the configuration information. The channel state information includes a precoding matrix indicator, a precoding matrix corresponding to the precoding matrix indicator includes a combination of a first coefficient and a first group of vectors or a combination of a first coefficient, a first group of vectors and a second group of vectors.

The information transmission apparatus provided by this embodiment is configured to implement the information transmission method applied to the second communication node in the embodiment shown in FIG. 2. The implementation principles and technical effects of the information transmission apparatus provided by this embodiment are similar to those of the information transmission method, and details are not described herein.

Figure 5:
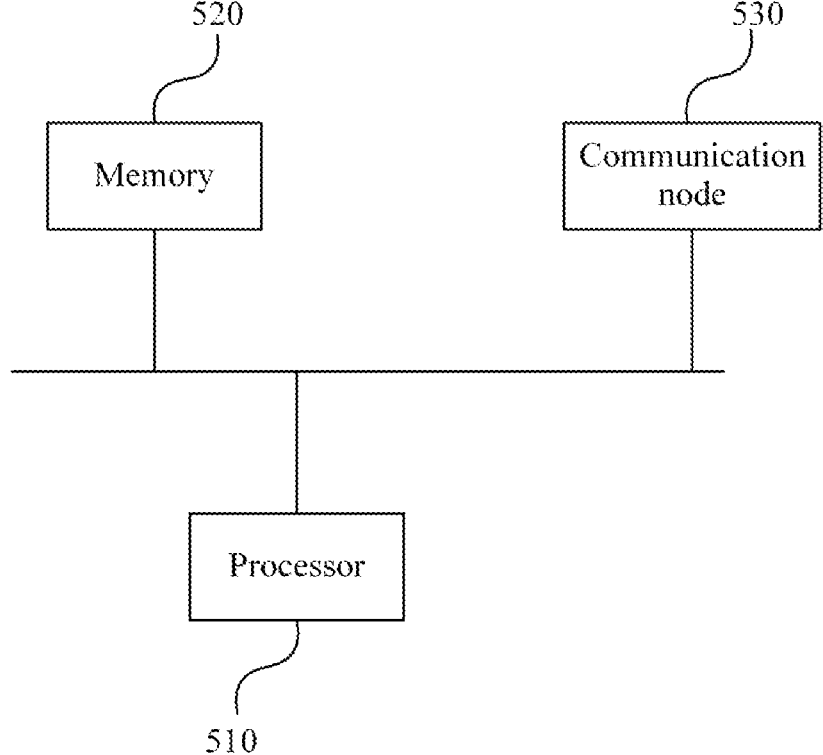
FIG. 5 is a schematic structural diagram of a communication device according to an embodiment of the present application.

FIG. 5 is a schematic structural diagram of a communication device according to an embodiment of the present application. As shown in FIG. 5, the communication device provided in the present application includes a processor 510, a memory 520, and a communication module 530. A number of processors 510 in the device may be one or more, such as one processor 510 in FIG. 5. A number of memories 520 in the device may be one or more, such as one memory 520 in FIG. 5. The processor 510, the memory 520 and the communication module 530 of the device may be connected via a bus or otherwise, such as via a bus in FIG. 5. In this embodiment, the device may be a first communication node, for example, the first communication node may be a terminal side (such as, a user equipment).

The memory 520, as a computer-readable storage medium, may be configured to store a software program, a computer-executable program, and a module, such as a program instruction/a module (such as the receiving module 310 and the reporting module 320 in the information transmission apparatus) corresponding to the device of any of the embodiments of the present application. The memory 520 may include a storage program region and a storage data region, the storage program region may store an operating system, an application program required for at least one function, and the storage data region may store data created according to use of the device, etc. Moreover, the memory 520 may include a high speed random access memory, and may also include a non-volatile memory such as at least one magnetic disk storage device, flash memory device, or other non-volatile solid state storage device. In some instances, the memory 520 may further include a memory remotely disposed with respect to the processor 510, and the remote memory may be connected to the device over a network. Instances of such networks include, but are not limited to, an Internet, an intranet, a local area network, a mobile communication network, and combinations thereof.

The communication module 530 is configured to perform a communication interaction between the first communication node and the second communication node.

In a case where the communication device is the first communication node, the above-described device may be configured to perform the information transmission method applied to the first communication node provided in any of the above-described embodiments, and has corresponding functions and effects.

In a case where the communication device is the second communication node, the above-described device may be configured to perform the information transmission method applied to the second communication node provided in any of the above-described embodiments, and has corresponding functions and effects.

An embodiment of the present application further provides a storage medium including a computer-executable instruction. The computer-executable instruction is configured to, when executed by a computer processor, perform the information transmission method applied to the first communication node. The method includes that: configuration information of a second communication node is received; and channel state information is reported to the second communication node according to the configuration information. The channel state information includes a precoding matrix indicator, a precoding matrix corresponding to the precoding matrix indicator includes a combination of a first coefficient and a first group of vectors or a combination of a first coefficient, a first group of vectors and a second group of vectors.

An embodiment of the present application further provides a storage medium including a computer-executable instruction. The computer-executable instruction is configured to, when executed by a computer processor, perform the information transmission method applied to the second communication node. The method includes that: configuration information is determined; the configuration information is sent to a first communication node so that the first communication node reports channel state information according to the configuration information. The channel state information includes a precoding matrix indicator, a precoding matrix corresponding to the precoding matrix indicator includes a combination of a first coefficient and a first group of vectors or a combination of a first coefficient, a first group of vectors and a second group of vectors.

It should be understood by those skilled in the art that the term "user equipment" covers any suitable type of wireless user equipment, such as a mobile phone, a portable data processing apparatus, a portable web browser or a vehicle-mounted mobile station.

In general, various embodiments of the present application may be implemented in hardware or special purpose circuits, software, logic or any combination thereof. For example, some aspects may be implemented in hardware, while other aspects may be implemented in firmware or software which may be executed by a controller, microprocessor or other computing apparatus, although the present application is not limited thereto.

The embodiments of the present application may be implemented by a data processor of a mobile apparatus executing computer program instructions, for example in a processor entity, or by hardware, or by a combination of software and hardware. The computer program instructions may be assembler instructions, instruction set architecture (ISA) instructions, machine instructions, machine-related instructions, microcode, firmware instructions, state setting data, or source or object codes written in any combination of one or more programming languages.

Any block diagram of the logic flow in the accompanying drawings of the present application may represent program processes, or may represent interconnected logic circuits, modules, and functions, or may represent a combination of program processes and logic circuits, modules, and functions. The computer program may be stored on a memory. The memory may be of any type suitable for the local technical environment and may be implemented using any suitable data storage technology, such as, but not limited to, a read-only memory (ROM), a random access memory (RAM), an optical memory device and system (digital versatile disc (DVD) or compact disk (CD)), and the like. Computer-readable media may include non-instantaneous storage media. Data processors may be of any type suitable for the local technical environment, such as, but not limited to, general-purpose computers, specialized computers, microprocessors, digital signal processors (DSP), application specific integrated circuits (ASIC), field-programmable gate array (FPGA)), and processors based on multi-core processor architectures.

What is claimed is:

1. An information transmission method, applied to a first communication node, comprising:
   receiving configuration information of a second communication node; and
   reporting channel state information to the second communication node according to the configuration information;
   wherein the channel state information comprises a precoding matrix indicator, and a precoding matrix corresponding to the precoding matrix indicator comprises a combination of a first coefficient, a first group of vectors and a second group of vectors; and
   wherein the precoding matrix indicator being indicating R precoding matrices for each channel quality indicator sub-band is determined according to a number of vectors of the second group of vectors, and R is a positive integer.

2. The method of claim 1, wherein reporting the channel state information to the second communication node according to the configuration information comprises:

determining a report condition of a first bitmap, wherein the first bitmap is configured to indicate a coefficient needing to be reported in the first coefficient;

determining an amplitude quantization set used by the first coefficient according to the report condition of the first bitmap; and reporting the first coefficient to the second communication node according to the amplitude quantization set.

3. The method of claim 2, wherein determining the amplitude quantization set used by the first coefficient according to the report condition of the first bitmap comprises one of:

in response to reporting the first bitmap to the second communication node, determining the amplitude quantization set used by the first coefficient as a first amplitude quantization set; or in response to not reporting the first bitmap to the second communication node, determining the amplitude quantization set used by the first coefficient as a second amplitude quantization set.

4. The method of claim 3, wherein the first amplitude quantization set is different from the second amplitude quantization set.

5. The method of claim 3, wherein all elements in the first amplitude quantization set are non-zero values, and the second amplitude quantization set comprises a zero value.

6. The method of claim 1, wherein reporting the channel state information to the second communication node according to the configuration information comprises:

determining a number of at least one to-be-reported coefficient in the first coefficient;

determining an amplitude quantization set used by the first coefficient according to the number of the at least one to-be-reported coefficient in the first coefficient; and reporting the number of the at least one to-be-reported coefficient in the first coefficient to the second communication node according to the amplitude quantization set.

7. The method of claim 6, wherein determining the amplitude quantization set used by the first coefficient according to the number of the at least one to-be-reported coefficients in the first coefficient comprises one of:

in response to reporting part of coefficients in the first coefficient to the second communication node, determining the amplitude quantization set used by the first coefficient as a first amplitude quantization set; or in response to reporting all coefficients in the first coefficient, determining the amplitude quantization set used by the first coefficient as a second amplitude quantization set.

8. The method of claim 1, wherein reporting the channel state information to the second communication node according to the configuration information comprises:

mapping a specific value of an amplitude indicator of the first coefficient to two candidate amplitude quantization values; and reporting the first coefficient to the second communication node according to the two candidate amplitude quantization values.

9. The method of claim 8, wherein one amplitude quantization value of the two candidate amplitude quantization values is indicated by utilizing a non-zero bit in a second bitmap; or another amplitude quantization value of the two candidate amplitude quantization values is indicated by using a zero bit in a second bitmap.

10. The method of claim 8, wherein, a phase indicator of the first coefficient corresponding to the specific value comprises one of a zero phase or a non-zero phase;

a candidate amplitude quantization value, to which the amplitude indicator of the first coefficient indicated by the zero phase is mapped, is a zero value; and a candidate amplitude quantization value, to which the amplitude indicator of the first coefficient indicated by the non-zero phase is mapped, is a non-zero value.

11. The method of claim 8, wherein one amplitude quantization value of the two candidate amplitude quantization values is a non-zero value, and another amplitude quantization value of the two candidate amplitude quantization values is a zero value.

12. The method of claim 1, wherein reporting the channel state information to the second communication node according to the configuration information comprises:

according to a value of an amplitude indicator of the first coefficient, determining a phase quantization set, to which a phase indicator of the first coefficient is mapped, corresponding to the value; and reporting the first coefficient to the second communication node according to the phase quantization set.

13. The method of claim 12, wherein according to the value of the amplitude indicator of the first coefficient, determining the phase quantization set, to which the phase indicator of the first coefficient is mapped, corresponding to the value comprises one of:

in response to determining that the value of the amplitude indicator of the first coefficient belongs to a first set, determining the phase quantization set, to which the phase indicator of the first coefficient is mapped, corresponding to the value as a first phase quantization set; or in response to determining that the value of the amplitude indicator of the first coefficient belongs to a second set, determining the phase quantization set, to which the phase indicator of the first coefficient is mapped, corresponding to the value as a second phase quantization set.

14. The method of claim 13, wherein in response to determining that the value of the amplitude indicator of the first coefficient belongs to the second set, and the phase indicator of the first coefficient is mapped to the second phase quantization set, jointly indicating an amplitude quantization value of the first coefficient by the amplitude indicator of the first coefficient and the phase indicator of the first coefficient.

15. The method of claim 13, wherein in response to determining that the value of the amplitude indicator of the first coefficient belongs to the second set, and the phase indicator of the first coefficient is mapped to the second phase quantization set, jointly indicating an amplitude quantization value of the first coefficient by the amplitude indicator of the first coefficient and a second bitmap.

16. The method of claim 1, wherein the number of vectors of the second group of vectors is 1, which indicates that R is 1.

17. A communication device, comprising a communication module, a memory, and at least one processor, wherein the communication module is configured to perform a communication interaction between a first communication node and a second communication node, the memory is configured to store at least one program, and the at least one program, when executed by the at least one processor, causes the at least one processor to implement the method of claim 1.

18. A non-transitory computer-readable storage medium, storing a computer program, wherein the computer program, when executed by a processor, implements the method of claim 1.

19. An information transmission method, applied to a second communication node, comprising:

determining configuration information; and sending the configuration information to a first communication node in a manner that the first communication node reports channel state information according to the configuration information;

wherein the channel state information comprises a precoding matrix indicator, and a precoding matrix corresponding to the precoding matrix indicator comprises a combination of a first coefficient, a first group of vectors and a second group of vectors; and wherein the precoding matrix indicator being indicating R precoding matrices for each channel quality indicator sub-band is determined according to a number of vectors of the second group of vectors, and R is a positive integer.

* * * * *